C. S. CHRISMAN.
BURNER.
APPLICATION FILED MAY 6, 1909.
933,019.
Patented Aug. 31, 1909.
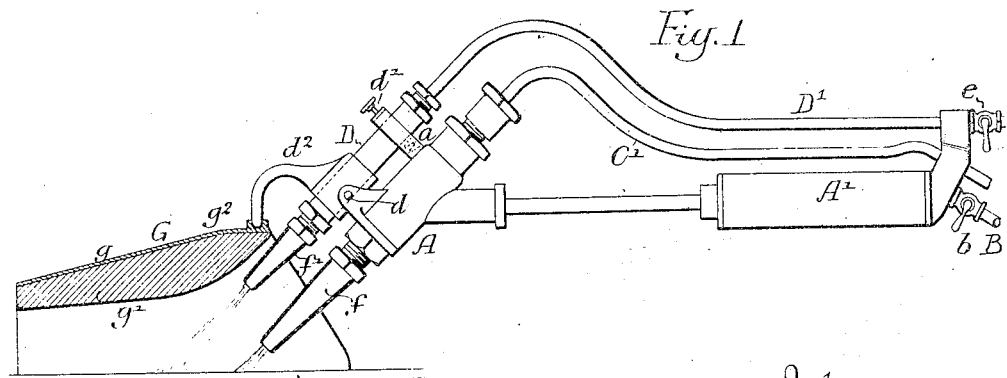
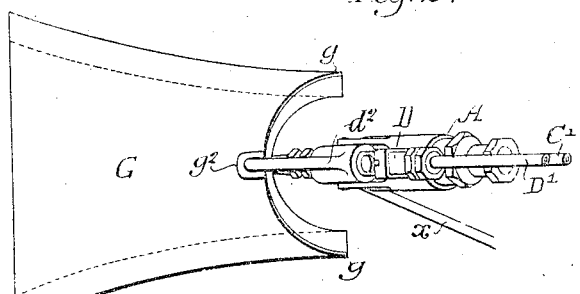
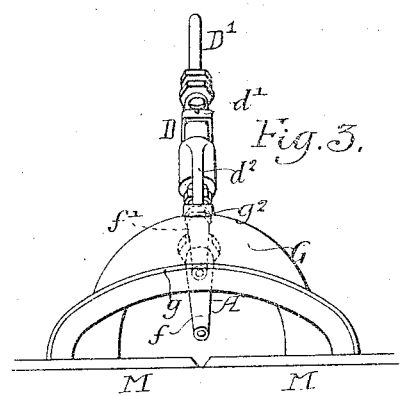
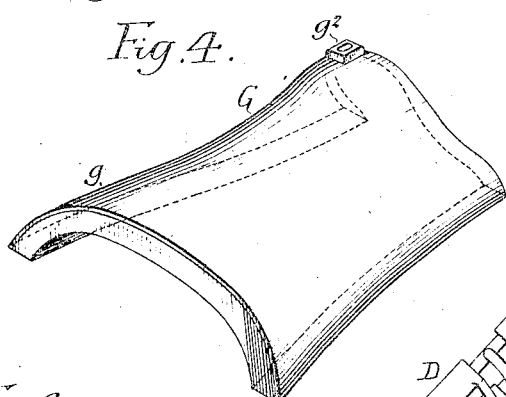
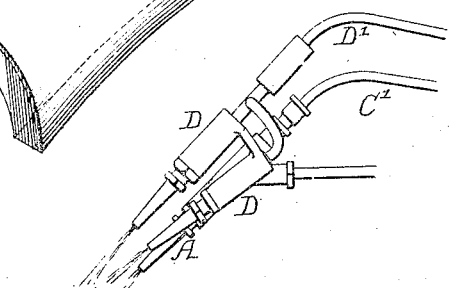
Inventor
Charles S. Chrisman,
by his Attorneys,
Howson & Howson
Witnesses

UNITED STATES PATENT OFFICE.

CHARLES S. CHRISMAN, OF WEST CHESTER, PENNSYLVANIA.

BURNER.

933,019.

Specification of Letters Patent.

Patented Aug. 31, 1909.

Application filed May 6, 1909. Serial No. 494,292.

*To all whom it may concern:*

Be it known that I, CHARLES S. CHRISMAN, a citizen of the United States, residing in West Chester, Pennsylvania, have invented certain Improvements in Burners, of which the following is a specification.

My invention relates to certain improvements in that type of burner used for welding metals, in which acetylene gas is mixed with oxygen to produce a flame sufficient to bring the parts to be united to a welding heat.

The object of my invention is to reduce the cost of operating such a burner, and to pre-heat and anneal the plates to be welded by the use of a comparatively cheap gas of a lower heating power. This object I attain in the following manner, reference being had to the accompanying drawings, in which:—

Figure 1, is a side view of my improved burner, with the hood in section; Fig. 2, is a plan view; Fig. 3, is an end view; Fig. 4, is a perspective view of the hood; Fig. 5, is a view showing the arrangement of three burners of a low heating power surrounding the main burner; and Fig. 6, is a view showing a series of burners.

Referring in the first instance to Figs. 1 and 2, A is the main burner connected to a chamber A' which in turn is connected to a pipe B leading from an acetylene gas tank. The burner is also connected to a pipe C, through which oxygen is admitted to the burner. $b$ is a valve controlling the admission of acetylene gas. In the present instance M, M are two metallic plates to be united by welding, and the ordinary practice is to direct the flame from the burner A onto the joint between the plates, heating the edges of the plates to a welding heat and causing the metal to flow. In order to fill the groove or space between the plates a metal bar $x$ is fused in, so as to make the welded joint of the same thickness as the other parts of the metal plates.

The objection to the use of a single burner, using acetylene gas and oxygen, is that the process of welding is comparatively slow and expensive, owing to the fact that acetylene gas is a high priced gas and that the plates to be welded have to be brought from a cold state to the welding heat within a small area and thus introducing internal strains.

By my invention I materially reduce the cost of welding and at the same time increase the speed at which a joint can be welded, retaining the products to heat a larger surface and by heating more gradually I reduce internal strains.

D is a burner mounted in close proximity to the burner A, either mounted rigidly on the burner A or pivoted thereto, as shown at $d$. The burner D can be adjusted by means of a set screw $d'$ mounted on a strap $a$ carried by the burner A. The burner D is connected by a tube D' to a pipe coupled to a hydrocarbon supply tank, and the flow of hydrocarbon fluid fuel is controlled by a valve $e$. By this construction a flame of relative low heating power is projected onto the plates to be welded directly in advance of the flame of high temperature, so that the plates are pre-heated before being subjected to the welding flame.

The use of the hydrocarbon fluid fuel is very economical, as the gas is very low in cost in comparison to the acetylene gas, and the speed of welding is materially increased owing to the fact that the surfaces to be welded are brought to comparatively high heat with the use of the cheap gas before they are subjected to the welding flame using expensive gas.

By the construction above referred to I am enabled to use a hood which incloses the flame and protects it to a certain extent, at the same time the hood can be used to diffuse the heat.

The hood G in the present instance is made as shown in the drawings, being narrow at the burner end and flared at the opposite end, so that the products of combustion, as they escape from the burners, spread over a greater surface of the plates and thus heat a large area. This hood is preferably made of a metallic casing $g$ having a lining $g'$ of graphite, or a compound of graphite to resist the high temperatures of the flames. The hood in the present instance has a socket $g^2$ for the reception of an arm $d^2$ projecting from the burner D, so that while the hood can be pushed over the surface of the plate through the medium of the burner, the burner can be manipulated to properly play the flame on the junction of the plates to finish the weld.

I have found that by introducing the flame of relatively low heating power between the hood and the flame of high temperature, that the hood will last for a considerable length of time, as the flame of low heating power absorbs and deflects the heat radiated from the flame of high temperature and carries it toward the surface to be welded and away from the hood.

In Figs. 1, 2 and 3, I have shown a single burner of low heating power, in connection with a burner of high heating power, but in Fig. 5, I have shown a form of apparatus in which three hydrocarbon fluid fuel burners are used, so as to completely separate the hood from the flame projected from the burner A, and it will be understood that any number of burners may be used and in any manner desired without departing from the essential features of the invention, as the arrangement of the burners will depend considerably upon the shape of the article to be welded.

In Fig. 6, I have shown a series of burners $D^2$, one arranged in advance of another, all using a hydrocarbon fuel and all in advance of the burner A' using acetylene and oxygen. These burners can be mounted upon a frame I or other support and this support can be moved over the plates or other articles to be welded, or the frame can be fixed and the plates moved. The same construction may be provided for the burner illustrated in Fig. 1, where it is desired to locate the burner permanently in position and move the articles to be welded past it.

It will be understood that the hydrocarbon fluid fuel burner may be used either with air or oxygen as desired, and I preferably provide the nozzles of the burners A and D with a covering $f$, $f'$ of graphite or other refractory material, so as to protect them from the intense heat.

I claim:—

1. The combination of two burners, one providing a flame of higher temperature than the other, the burner providing the low temperature flame being located in advance of the other burner, so as to pre-heat the surface to be acted upon by the flame from said other burner.

2. The combination in a welding apparatus, of two burners, one burner being connected to tubes supplying oxygen and acetylene gas to produce a flame of high temperature, a second burner so located as to project a flame in advance of the flame from the first burner, a tube connected to said second burner for supplying a low grade of gas producing a flame of a lower temperature than the flame of the first mentioned burner, so that the surface to be acted upon will be pre-heated before being subjected to the welding flame.

3. The combination of a burner supplying a flame of high temperature, a second burner supplying a flame of low temperature, with a hood confining a flame from both burners.

4. The combination in a welding apparatus, of a burner, two pipes connected to the burner, one for supplying oxygen and the other for supplying acetylene gas, a hood inclosing the flame from said burner, with one or more burners connected to a pipe for supplying a hydrocarbon fluid fuel of comparatively low flame temperature and arranged to project a flame between the flame from the first mentioned burner and the hood, said hood being connected to the burners so as to move with the burners over the surfaces to be welded.

5. The combination of a hood of graphite or analogous material, said hood being open at the bottom and at each end and narrower at one end than at the other, with a burner projecting into the narrow end of the hood.

6. The combination of a hood of graphite or analogous material narrow at one end and enlarged at the opposite end, two burners projecting into the hood at the narrow end, means for supplying different gases to the burners producing flames of different temperatures, the flame of low temperature being projecting between the hood and the flame of high temperature.

7. The combination of two burners, one providing a flame of a higher temperature than the other, a hood inclosing the burners and made of refractory material and a non-conducting covering for each burner.

In testimony whereof, I have signed my name to this specification, in the presence of two subscribing witnesses.

CHARLES S. CHRISMAN.

Witnesses:
Wm. E. Shupe,
Wm. A. Barr.